(12) United States Patent
Sarosi et al.

(10) Patent No.: US 10,336,340 B2
(45) Date of Patent: Jul. 2, 2019

(54) METHOD AND APPARATUS FOR ALTERING AT LEAST ONE DRIVING PARAMETER OF A VEHICLE DURING TRAVEL

(71) Applicant: Robert Bosch GmbH, Stuttgart (DE)

(72) Inventors: Andras Sarosi, Szekesfehervar (HU); Attila Licsar, Ajka (HU); Csaba Gyulai, Godollo (HU); Tor Oyvind Didriksen, Gyongyoshalasz (HU)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 15/612,314

(22) Filed: Jun. 2, 2017

(65) Prior Publication Data

US 2018/0015930 A1 Jan. 18, 2018

(30) Foreign Application Priority Data

Jul. 13, 2016 (DE) .................. 10 2016 212 702

(51) Int. Cl.
| | |
|---|---|
| *B60L 9/00* | (2019.01) |
| *B60W 40/06* | (2012.01) |
| *B60W 50/00* | (2006.01) |
| *B60W 30/182* | (2012.01) |

(52) U.S. Cl.
CPC .......... *B60W 40/06* (2013.01); *B60W 30/182* (2013.01); *B60W 50/00* (2013.01); *B60W 2050/0095* (2013.01); *B60W 2420/42* (2013.01); *B60W 2550/22* (2013.01); *B60W 2710/0677* (2013.01); *B60W 2710/08* (2013.01); *B60W 2710/10* (2013.01)

(58) Field of Classification Search
CPC ............. B60W 40/06; B60W 2710/08; B60W 2420/42
USPC .............. 701/22, 28; 715/700; 382/103, 104
See application file for complete search history.

(56) References Cited

U.S. PATENT DOCUMENTS

| | | | | |
|---|---|---|---|---|
| 2009/0074249 A1* | 3/2009 | Moed | ................. | G06K 9/00818 382/104 |
| 2009/0172527 A1* | 7/2009 | Buecker | ........... | G08G 1/096716 715/700 |
| 2010/0274422 A1* | 10/2010 | Schrey | ............... | G01C 21/3461 701/22 |
| 2015/0151725 A1* | 6/2015 | Clarke | .................. | B60W 30/00 701/28 |
| 2015/0302262 A1* | 10/2015 | Moesle | .............. | G06K 9/00825 382/103 |

(Continued)

*Primary Examiner* — Shardul D Patel
(74) *Attorney, Agent, or Firm* — Norton Rose Fulbright US LLP; Gerard Messina (57) ABSTRACT

A method for altering at least one driving parameter of a vehicle during travel. The method includes a step of reading in a traffic-sign signal, in which a traffic-sign signal is read in, the traffic-sign signal representing an altered traffic zone, indicated by a traffic sign, at one position. In a step of reading in a map signal, a map signal is read in which represents a traffic zone, indicated by a map, at the position. In a comparing step, the traffic-sign signal is compared to the map signal. In a last step of providing, an alteration signal is provided for altering at least the driving parameter, if a predetermined relationship exists between the traffic-sign signal and the map signal.

12 Claims, 9 Drawing Sheets

(56) References Cited

U.S. PATENT DOCUMENTS

| | | | |
|---|---|---|---|
| 2015/0321672 A1* | 11/2015 | Schondorf | G06Q 50/30 |
| | | | 701/22 |
| 2016/0347324 A1* | 12/2016 | Yoshitomi | B60W 40/04 |
| 2016/0350605 A1* | 12/2016 | Yoshitomi | G06K 9/00818 |
| 2016/0350606 A1* | 12/2016 | Yoshitomi | G06K 9/00818 |
| 2017/0010117 A1* | 1/2017 | Oh | G01C 21/3492 |
| 2018/0170349 A1* | 6/2018 | Jobson | B60W 50/0097 |

* cited by examiner

AreaC

METHOD AND APPARATUS FOR ALTERING AT LEAST ONE DRIVING PARAMETER OF A VEHICLE DURING TRAVEL

CROSS REFERENCE

The present application claims the benefit under 35 U.S.C. § 119 of German Patent Application No. DE 102016212702.0 filed on Jul. 13, 2016, which is expressly incorporated herein by reference in its entirety.

BACKGROUND INFORMATION

In road traffic, there are emission control areas in which the intention is to protect the environment, e.g., by low $CO_2$ emissions of vehicles. Many vehicles have possibilities for satisfying the environmental standards called for in the emission control areas. To protect the environment, it would be helpful if these vehicles could automatically adjust themselves to the environmental standards demanded in the emission control areas.

The present invention includes an apparatus, a method, and a computer program.

SUMMARY

In accordance with example embodiments of the present invention, a method is provided for altering at least one driving parameter of a vehicle during travel, an apparatus that uses this method, as well as, finally, a corresponding computer program. Advantageous further developments of the present invention are described herein.

An example method is provided for altering at least one driving parameter of a vehicle during travel. The method includes a step of reading in a traffic-sign signal, in which a traffic-sign signal is read in via an interface to a read-in device, the traffic-sign signal representing an altered traffic zone, indicated by a traffic sign, at one position. In a step of reading in a map signal, a map signal is read in which represents a traffic zone, indicated by a map, at the position. In a comparing step, the traffic-sign signal is compared to the map signal. In a last providing step, an alteration signal is provided to alter at least the driving parameter, if a predetermined relationship exists between the traffic-sign signal and the map signal.

In accordance with the present invention, the method, in response to an altered traffic zone identified by a traffic sign and after a comparison with a map, enables at least one driving parameter of a vehicle to be altered independently in order, for example, to satisfy demands on the vehicle applicable in this traffic zone. Advantageously, a manual alteration of the driving parameter by the driver is therefore no longer necessary. For example, the position may be understood to be a point in or on a road or a road section. The position may also be a geographical location which, for instance, may be indicated in coordinates.

For example, this is relevant when, in the step of reading in the traffic-sign signal, the traffic-sign signal represents a traffic zone denoting an emission control area. In this context, in the providing step, an alteration signal may be made available, which is provided to alter at least one driving parameter, formed as a parameter of an engine power output and/or of a transmission control and/or of a chassis control, and/or to change over from a combustion-engine drive to an electric drive. Thus, upon recognition of the emission control area, at least one of these driving parameters of the vehicle may be adjusted advantageously in such a way that the vehicle drives in a more environmentally friendly manner, e.g., emits less environmentally harmful $CO_2$.

According to one specific embodiment, in the providing step, an alteration signal may also be provided, which is formed to transfer the vehicle into an ECO mode. In the ECO mode, a plurality of different driving parameters may be preset, which permit environmentally friendly driving.

In the providing step, the alteration signal may be provided when the traffic-sign signal and the map signal agree within a tolerance range. Thus, the comparing step may be used to confirm the traffic-sign signal at a position by the map signal at the same position, in order to especially reliably identify the traffic zone altered here. Since there may be slight deviations between the position of the traffic sign and the altered traffic zone marked in the map, in the comparing step, the traffic-sign signal may have a position of the traffic sign which may deviate from the traffic zone within a tolerance range of, e.g., five to ten meters.

According to one specific embodiment, in the step of reading in the traffic-sign signal, the traffic-sign signal may be read in via an interface to a read-in device in the form of a camera of the vehicle. The vehicle camera is able to optically recognize the traffic sign in a quick and easy manner, and thereupon to provide the traffic-sign signal. For example, since many vehicles with a driver assistance system also already have a vehicle camera, no additional costs are incurred for this.

The method may also have a storage step, in which at least one previous driving parameter is stored that represents a driving parameter prior to the driving parameter being altered. For example, if the previous driving parameter is stored, it may quickly be reestablished again upon leaving the altered traffic zone. For instance, the previous driving parameter may be saved in response to the comparing step, if the traffic-sign signal and the map signal agree within a tolerance range.

The method may also have a step of further reading-in, in which a leave signal is read in that represents leaving of the altered traffic zone, indicated by a traffic sign, at a further position. In this context, the step of the further reading-in may be carried out in response to the providing step. When, in a subsequent step of the further comparing, the leave signal is compared to a further map signal that represents a further traffic zone, indicated by the map, at the further position, at least the altered driving parameter may be altered again in conformity with the requirements of the further traffic zone. In this context, the step of the further comparing may be carried out in response to the step of the further reading-in.

If the leave signal agrees with the further map signal within a tolerance range, in a reestablishment step, a reestablishment signal may be output that reestablishes the previous driving parameter, for example. In this context, the reestablishment step may be carried out in response to the step of the further comparing. Thus, for example, in traffic zones in which an emission control area no longer exists, the vehicle is able to adjust driving parameters independently. Alternatively, in the reestablishment step, a reestablishment signal may also be output, for example, which is formed to switch back again from the ECO mode to a SPORT mode of the vehicle.

For example, this method may be implemented in software or hardware or in a mixed form of software and hardware, e.g., in a control unit.

The approach presented here also provides an apparatus which is designed to carry out, control or implement the steps of a variant of a method presented here in suitable devices.

The objective underlying the approach may be achieved quickly and efficiently by this embodiment variant of the approach in the form of an apparatus, as well.

To that end, the apparatus may have at least one arithmetic logic unit for processing signals or data, at least one memory unit for storing signals or data, at least one interface to a sensor or an actuator for the reading in of sensor signals from the sensor or for the output of data signals or control signals to the actuator and/or at least one communication interface for the reading-in or output of data, which are embedded in a communications protocol. For instance, the arithmetic logic unit may be a signal processor, a microcontroller or the like, whereas the memory unit may be a flash memory, an EPROM or a magnetic memory unit. The communication interface may be designed to read in or output data in wireless and/or line-conducted fashion, a communication interface which is able to read in or output line-conducted data being able to read in this data electrically, for example, or optically from a corresponding data-transmission line or output it into a corresponding data-transmission line.

In the present case, an apparatus may be understood to be an electrical unit that processes sensor signals and outputs control signals and/or data signals as a function thereof. The apparatus may have an interface which may be implemented in hardware and/or software. In the case of a hardware implementation, the interfaces may be part of what is termed a system ASIC, for example, that includes a wide variety of functions of the apparatus. However, it is also possible for the interfaces to be separate, integrated circuits or to be made up at least partially of discrete components. If developed in software, the interfaces may be software modules which, for example, are present in a microcontroller in addition to other software modules.

In one advantageous embodiment, an alteration signal is controlled by the apparatus. To that end, for example, the apparatus is able to access sensor signals such as a traffic-sign signal and a map signal. The control is carried out via actuators such as an interface to a read-in device, an interface to a map and a comparator.

Also of advantage is a computer-program product or computer program having program code that may be stored on a machine-readable carrier or storage medium such as a semiconductor memory, a hard-disk storage or an optical memory, and is used to carry out, implement and/or control the steps of the method according to one of the previously described specific embodiments, especially when the program product or program is executed on a computer or an apparatus Exemplary embodiments of the present invention are shown in the figures and are explained in greater detail below.

DETAILED DESCRIPTION OF EXAMPLE EMBODIMENTS

In the following description of preferred exemplary embodiments of the present approach, the same or similar reference numerals are used for the similarly functioning elements shown in the various figures, a description of these elements not being repeated.

Figure 1:
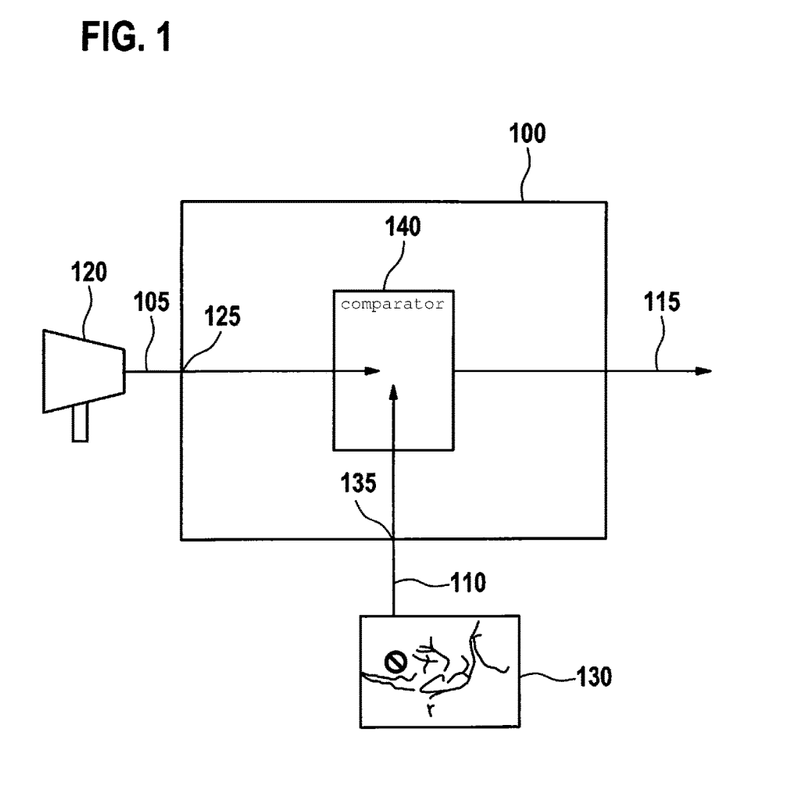
FIG. 1 shows a block diagram of an apparatus for altering at least one driving parameter of a vehicle during travel according to one exemplary embodiment.

FIG. 1 shows a block diagram of an apparatus 100 for altering at least one driving parameter of a vehicle during travel according to one exemplary embodiment.

Apparatus 100 is designed to read in at least one traffic-sign signal 105 and a map signal 110, to compare them, and to provide an alteration signal 115 which is formed to alter at least one driving parameter, if a predetermined relationship exists between traffic-sign signal 105 and map signal 110.

In this case, traffic-sign signal 105 represents an altered traffic zone, indicated by a traffic sign, at one position. In this context, the position may be understood to be a geographical position. According to this exemplary embodiment, apparatus 100 is designed to read in traffic-sign signal 105 from a camera 120 of the vehicle; for this, apparatus 100 has a camera interface 125 to vehicle camera 120.

Map signal 110 represents a traffic zone, indicated by a map 130, at the position. According to this exemplary embodiment, apparatus 100 is designed to read in map signal 110 from map 130; for this, apparatus 100 has a map interface 135 to map 130.

In addition, apparatus 100 has a comparator 140 which is designed to compare traffic-sign signal 105 and map signal 110.

According to this exemplary embodiment, apparatus 100 is designed to output the alteration signal when traffic-sign signal 105 and map signal 110 agree within a tolerance range.

According to this exemplary embodiment, traffic-sign signal 105 represents a traffic zone designating an emission control area.

According to this exemplary embodiment, alteration signal 115 is provided to alter at least one driving parameter, formed as a parameter of an engine power output and of a transmission control and of a chassis control, and to change from a combustion-engine drive to an electric drive.

According to an alternative exemplary embodiment, alteration signal 115 may be formed to transfer the vehicle into an ECO mode, if the vehicle possesses an ECO mode.

Figure 2:
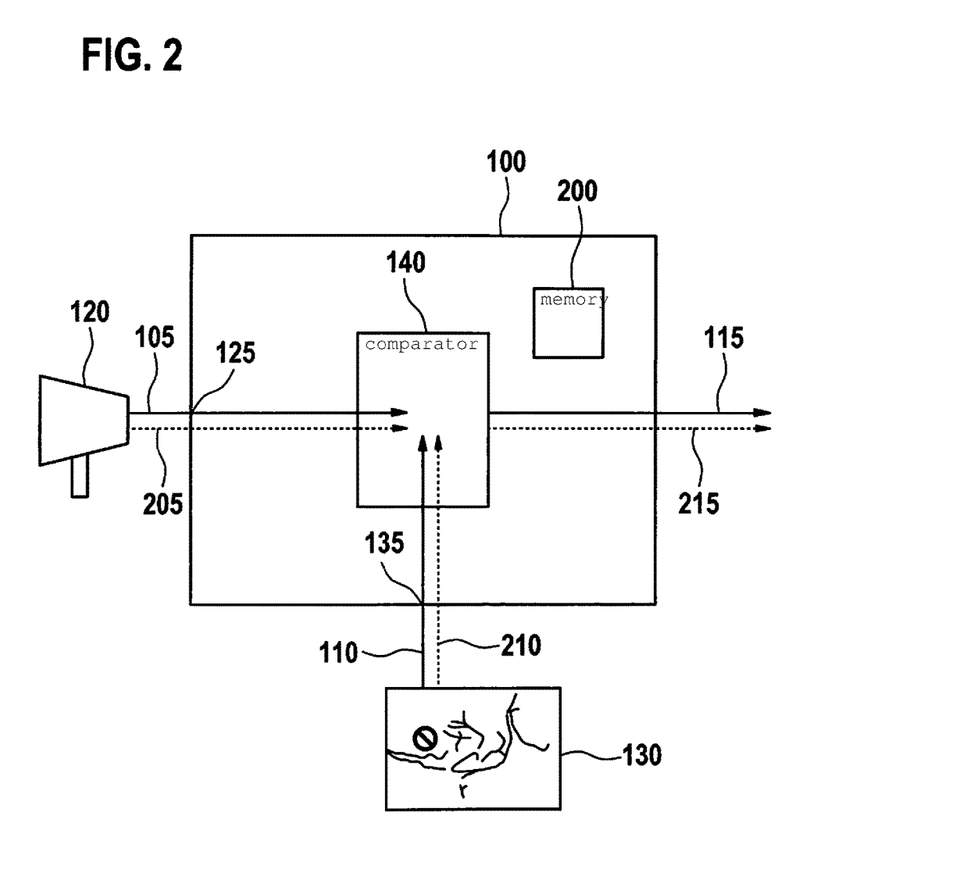
FIG. 2 shows a block diagram of an apparatus for altering at least one driving parameter of a vehicle during travel according to one exemplary embodiment.

FIG. 2 shows a block diagram of an apparatus 100 for altering at least one driving parameter of a vehicle during travel according to one exemplary embodiment. It may be apparatus 100 described with reference to FIG. 1, with the difference that apparatus 100 has a memory unit 200. In addition, apparatus 100 is designed to read in at least one leave signal 205 and a further map signal 210, and to output a reestablishment signal 215.

Memory unit 200 is designed to store a previous driving parameter that represents a driving parameter prior to the driving parameter being altered.

Leave signal 205 represents a leaving of the altered traffic zone, indicated by a traffic sign, at a further position. Apparatus 100 is designed to read in leave signal 205 via camera interface 125 to vehicle camera 120 in response to the provision of alteration signal 115.

Further map signal 210 represents a further traffic zone, indicated by map 130, at the further position. Apparatus 100 is designed to read in further map signal 210 via map interface 135 to map 130 in response to leave signal 205.

Comparator 140 is designed according to this exemplary embodiment to compare leave signal 205 and further map signal 210 and to output reestablishment signal 215 when leave signal 205 agrees with further map signal 210 within a tolerance range. According to this exemplary embodiment, reestablishment signal 215 is formed to reestablish the previous driving parameter stored in memory unit 200.

In the following, details already described on the basis of FIG. 2 are explained again more precisely.

Many functions of advanced driver assistance systems, ADAS for short, operate as a function of information which is read in from vehicle sensors. A few of these functions are, for example, a lane departure warning, LDW for short, an active lane keeping assist, short LKA, an automatic high beam, short AHB, an adaptive cruise control, short ACC, an intelligent emergency braking, short IEB, a traffic sign recognition, short TSR, a traffic light recognition, short TLR and a traffic crossing detection, short TCD. Since desired results are often not completely furnished or cannot be furnished solely with the aid of driving-environment sensors such as radar and/or a camera like vehicle camera 120, these functions are frequently backed up and checked by map-based databases, here map 130.

It is necessary to recognize and classify objects, and to determine positions of the objects relative to the vehicle. This may be based on information from driving-environment sensors such as camera images, radar or other sensor information, e.g., road curves/trajectories, which may be determined as a function of the steering angle. Furthermore, it may be based on vehicle speeds, temperatures, etc. Likewise, the recognition and classification may be based on map-based navigation information, which is based on GPS positions, thus, for example, a position and a distance to a next intersection in relation to the vehicle or a traffic sign which indicates a speed limit. In addition, the recognition and classification may be based on a fusion of traffic-sign information and map information. By fusing the information from both sources, an altered traffic zone may be recognized.

Many vehicles have systems which support environmental protection, e.g., systems for lowering $CO_2$ emissions, fuel consumption and noise level. Such systems are called start-stop systems or hybrid drive chains. An Eco mode, which adjusts parameters of the drive, of the transmission and of the chassis in such a way that the vehicle drives in a more environmentally friendly and economical manner, is thus able to be set by the driver, for example.

In addition, there are special traffic zones, e.g., IG-L (emission protection law) zones in Austria or low-emission zones in Germany in which the emission control is regulated. Here, generally, the emission control is realized by traffic signs that designate a reduced speed limit and traffic signs which identify the emission control area itself. Driving into such an emission control area is often not allowed for vehicles whose engines do not comply with the requisite environmental standards. There are already systems which connect ADAS systems to other functions, thus, for example, headlights may be switched on upon leaving a town. Other systems in turn link ADAS systems, e.g., navigation, or traffic-sign recognition, to the adaptive cruise control in order to provide an intelligent adaptive cruise control.

Although there are emission control areas, systems for recognizing traffic signs and for detecting GPS positions, and although some vehicles also have an environmentally friendly driving mode, until now, the systems named have not been connected to each other. Although conventional ADAS systems are able to recognize altered traffic zones based on traffic-sign recognition and/or with the aid of navigation systems, there are no automated systems which are designed to adjust driving parameters accordingly in response to the altered traffic zones. Up to now, the responsibility for this has rested with the driver, who is able to adjust the driving style and the driving parameters manually, thus, for example, is able to switch manually to the ECO mode when necessary. However, it is also possible that the driver may fail to see a traffic sign and consequently not switch on the emission-control functions, or that the driver may not be able to switch on these functions while driving owing to the complexity of the user interface.

The approach presented here advantageously permits an altered traffic zone to be recognized through the traffic-sign recognition and a comparison with information from map 130. Hereinafter, the driving parameter is altered and/or the ECO mode is activated or deactivated as a function of the recognized traffic zone. In this connection, it is especially advantageous that there is an automatic switchover to the environmentally friendly mode, even if the driver overlooks or ignores a corresponding traffic sign. Thus, emissions may be reduced in sensitive areas, and the fuel consumption and noise level of the vehicle may be lowered.

The functioning of the apparatus introduced here is described below with the aid of an exemplary embodiment. Based on at least one traffic sign, a vehicle camera 120, which may be a video camera, recognizes an altered traffic zone, e.g., an IG-L zone shown in FIG. 6 or an emission control area shown in FIG. 7. In addition, the altered traffic zone is determined based at least on information from a map 130. The information of the traffic sign in the form of traffic-sign signal 105 and of the map in the form of map signal 110 is compared in order, with high probability, to identify an altered traffic zone. The ECO mode is automatically activated and/or other driving parameters are adjusted as a function of the current traffic zone. The driving mode used up to that point is stored in memory unit 200. Upon leaving the altered traffic zone, vehicle camera 120 recognizes the further traffic zone based on at least one traffic sign. The leaving of the altered traffic zone is also determined in the following based at least on information from map 130. The information of the traffic sign in the form of leave signal 205 and of the map in the form of further map signal 210 is compared again in order, with high probability, to identify an altered, i.e., the further traffic zone. The stored, previously used driving mode is now reestablished by reestablishment signal 215.

Any vehicle which has an ADAS system and adjustable driving parameters and/or driving modes, such as the ECO mode or a SPORT mode, for instance, is able to use apparatus 100 presented. In this context, parameters such as a (scalable) engine power output, a transmission control and/or a chassis control are parameterized and/or an adjustable combustion-engine drive or electric drive is adjusted.

Figure 3:
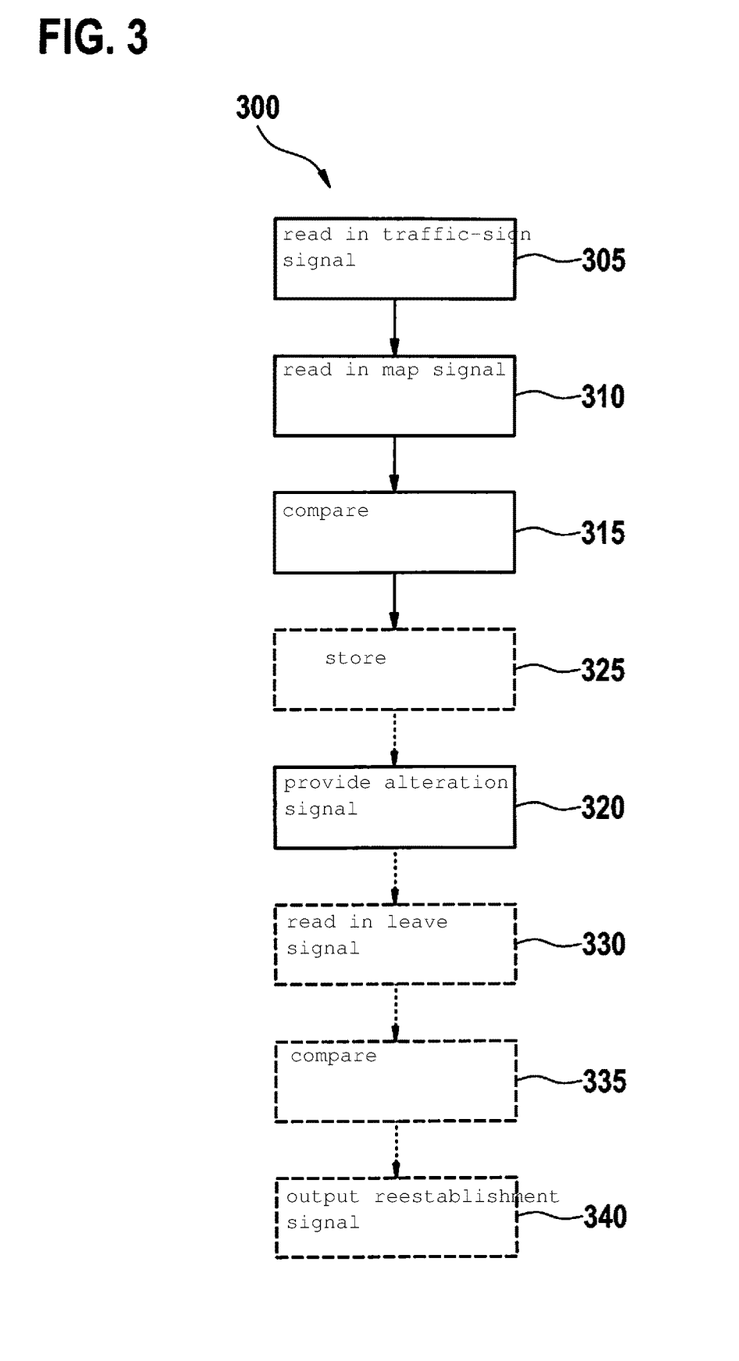
FIG. 3 shows a flowchart of a method for altering at least one driving parameter of a vehicle during travel according to one exemplary embodiment.

FIG. 3 shows a flowchart of a method 300 for altering at least one driving parameter of a vehicle during travel according to one exemplary embodiment. It may be a method 300, which is executable by one of the apparatuses described on the basis of the previous figures. In a step of reading in 305 a traffic-sign signal, a traffic-sign signal is read in, the traffic-sign signal representing an altered traffic zone, indicated by a traffic sign, at one position, e.g., on a street. In a step 310 of reading in a map signal, a map signal is read in which represents a traffic zone, indicated by a map, at the position. In a comparing step 315, the traffic-sign signal is compared to the map signal. In a providing step 320, an alteration signal is provided to alter at least the driving parameter, if a predetermined relationship exists between the traffic-sign signal and the map signal.

Optionally, according to this exemplary embodiment, the method has a step 325 of storing, a step 330 of further reading-in, a step 335 of further comparing and a reestablishment step 340.

In storing step 325, at least one previous driving parameter is stored, which represents a driving parameter prior to the driving parameter being altered.

In step 330 of the further reading-in, a leave signal is read in which represents leaving of the altered traffic zone, indicated by a traffic sign, at a further position. Step 330 of the further reading-in is carried out in response to providing step 320. In step 335 of the further comparing, the leave signal is compared to a further map signal which represents a further traffic zone, indicated by the map, at the further position. Step 335 of the further comparing is carried out in response to step 330 of the further reading-in. In reestablishment step 340, a reestablishment signal for reestablishing the previous driving parameter is output in response to step 335 of the further comparing, if the leave signal agrees with the further map signal within a tolerance range.

Figure 4:
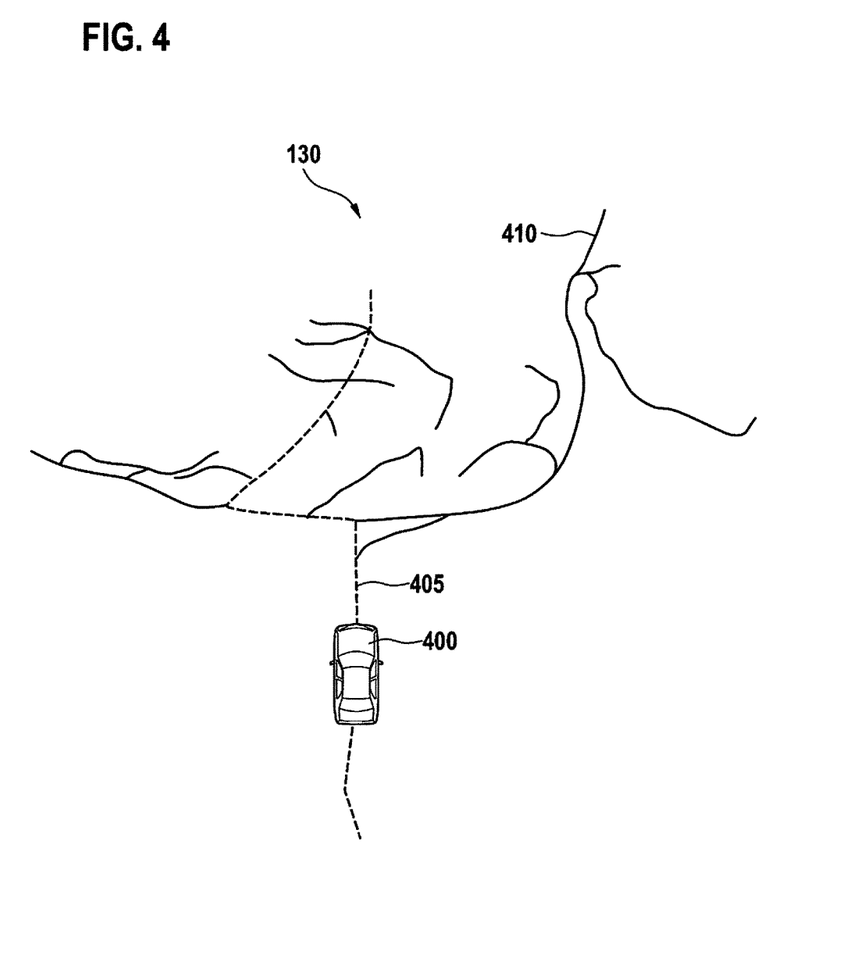
FIG. 4 shows recognition of an altered traffic zone with the aid of a map according to one exemplary embodiment.

FIG. 4 shows a recognition of an altered traffic zone 405 with the aid of a map 130 according to one exemplary embodiment. It may be map 130 described with reference to FIGS. 1 and 2. According to this exemplary embodiment, vehicle 400 is linked to map 130 and is located on a street with altered traffic zone 405. Here, by way of example, altered traffic zone 405 is assigned to an emission control area and is represented as a dashed line. According to this exemplary embodiment, a plurality of solid lines represent streets which are not assigned to any emission control area in map 130.

Figure 5:
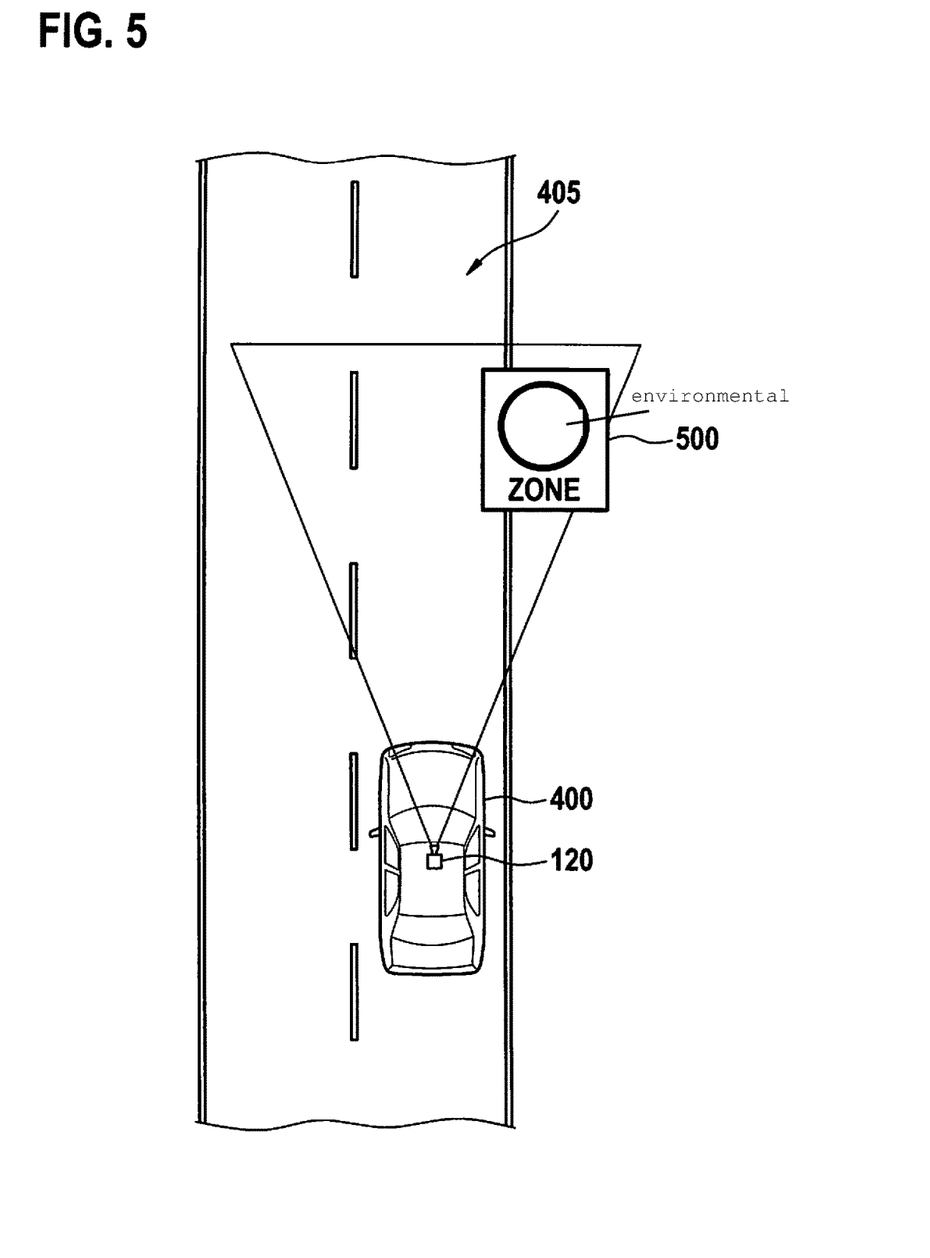
FIG. 5 shows recognition of an altered traffic zone with the aid of a vehicle camera according to one exemplary embodiment.

FIG. 5 shows a recognition of an altered traffic zone 405 with the aid of a vehicle camera 120 according to one exemplary embodiment. It may be vehicle camera 120 described on the basis of FIGS. 1 and 2. According to this exemplary embodiment, vehicle 400 has vehicle camera 120, which optically recognizes a traffic sign 500 that indicates an emission control area.

Figure 6:
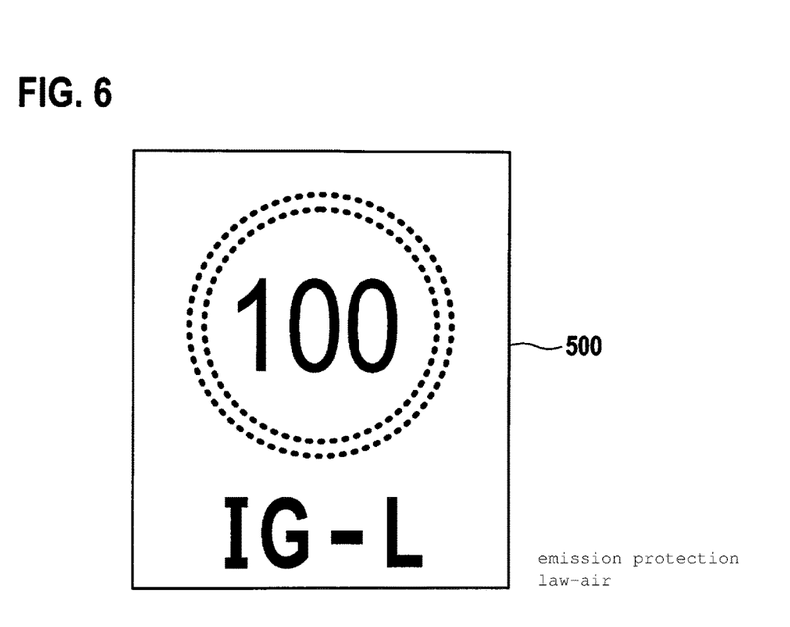
FIG. 6 shows a schematic representation of a traffic sign in Austria that indicates an emission control area according to one exemplary embodiment.

FIG. 6 shows a schematic representation of a traffic sign 500 in Austria, which indicates an emission control area according to one exemplary embodiment. It may be a traffic sign 500 which is recognized by one of apparatuses 100 described on the basis of FIGS. 1 and 2.

Figure 7:
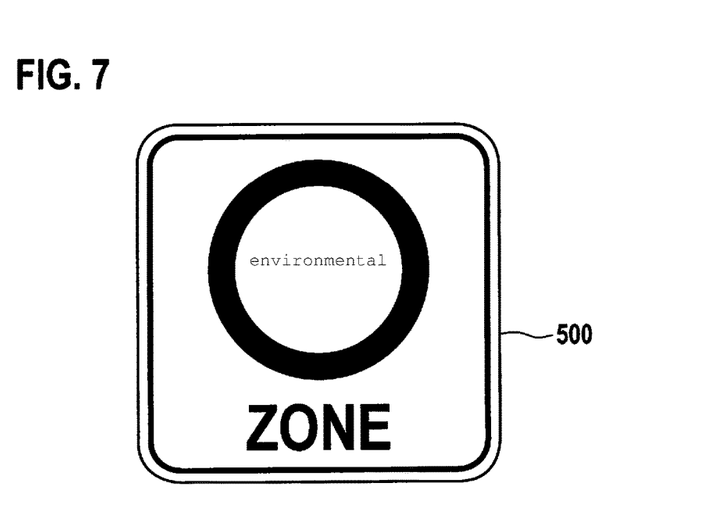
FIG. 7 shows a schematic representation of a traffic sign in Germany that indicates an emission control area according to one exemplary embodiment.

FIG. 7 shows a schematic representation of a traffic sign 500 in Germany, which indicates an emission control area according to one exemplary embodiment. It may be a traffic sign 500 which is recognized by one of apparatuses 100 described on the basis of FIGS. 1 and 2.

Figure 8:
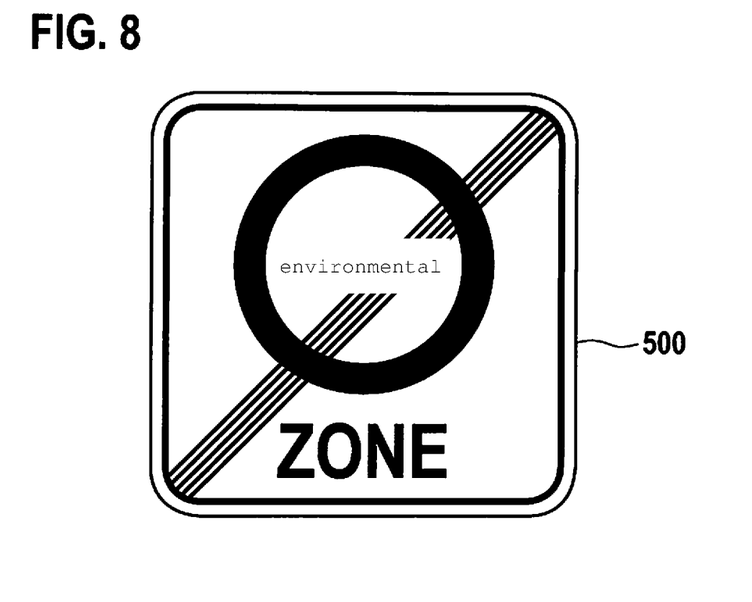
FIG. 8 shows a schematic representation of a traffic sign in Germany that indicates the leaving of an emission control area according to one exemplary embodiment.

FIG. 8 shows a schematic representation of a traffic sign 500 in Germany, which indicates leaving of an emission control area according to one exemplary embodiment. It may be a traffic sign 500 which is recognized by one of apparatuses 100 described on the basis of FIGS. 1 and 2.

Figure 9:
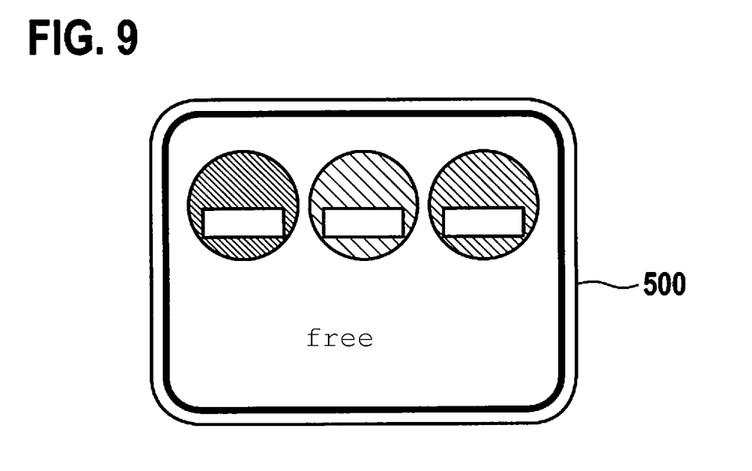
FIG. 9 shows a schematic representation of a traffic sign in Germany that indicates an emission control area according to one exemplary embodiment.

FIG. 9 shows a schematic representation of a traffic sign 500 in Germany, which indicates an emission control area according to one exemplary embodiment. It may be a traffic sign 500 which is recognized by one of apparatuses 100 described on the basis of FIGS. 1 and 2.

Figure 10:
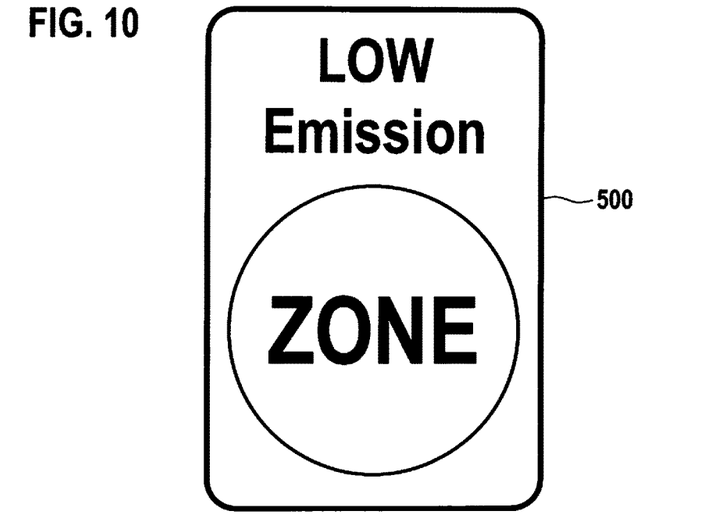
FIG. 10 shows a schematic representation of a traffic sign in Great Britain that indicates an emission control area according to one exemplary embodiment.

FIG. 10 shows a schematic representation of a traffic sign 500 in Great Britain, which indicates an emission control area according to one exemplary embodiment. It may be a traffic sign 500 which is recognized by one of apparatuses 100 described on the basis of FIGS. 1 and 2.

Figure 11:
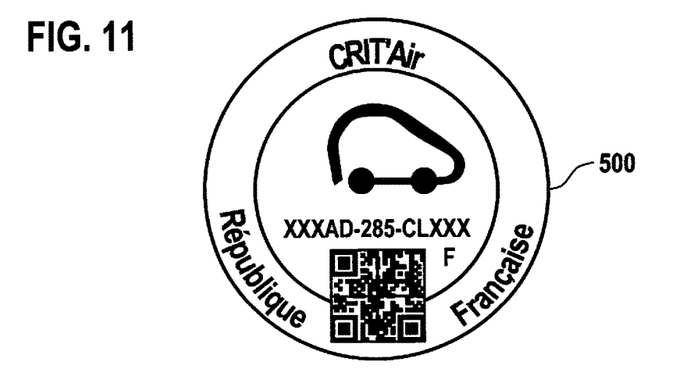
FIG. 11 shows a schematic representation of a traffic sign in France that indicates an emission control area according to one exemplary embodiment.

FIG. 11 shows a schematic representation of a traffic sign 500 in France, which indicates an emission control area according to one exemplary embodiment. It may be a traffic sign 500 which is recognized by one of apparatuses 100 described on the basis of FIGS. 1 and 2.

Figure 12:
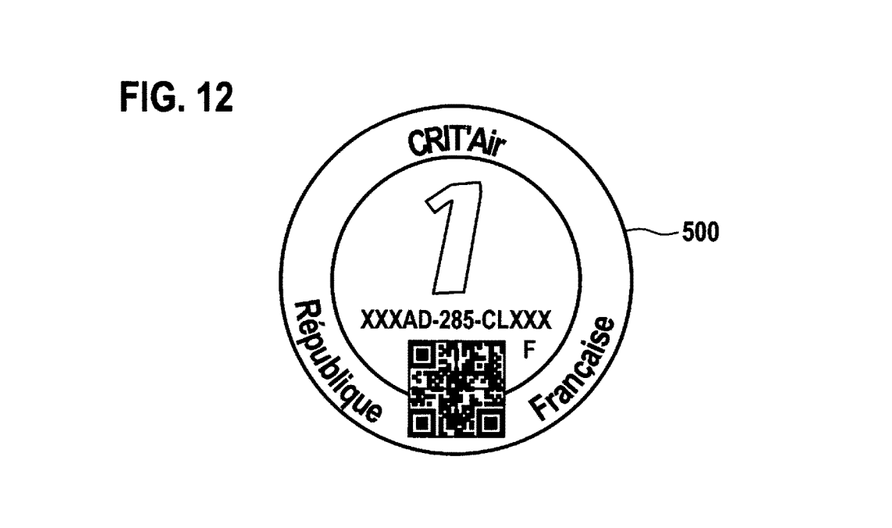
FIG. 12 shows a schematic representation of a traffic sign in France that indicates an emission control area according to one exemplary embodiment.

FIG. 12 shows a schematic representation of a traffic sign 500 in France, which indicates an emission control area according to one exemplary embodiment. It may be a traffic sign 500 which is recognized by one of apparatuses 100 described on the basis of FIGS. 1 and 2.

Figure 13:
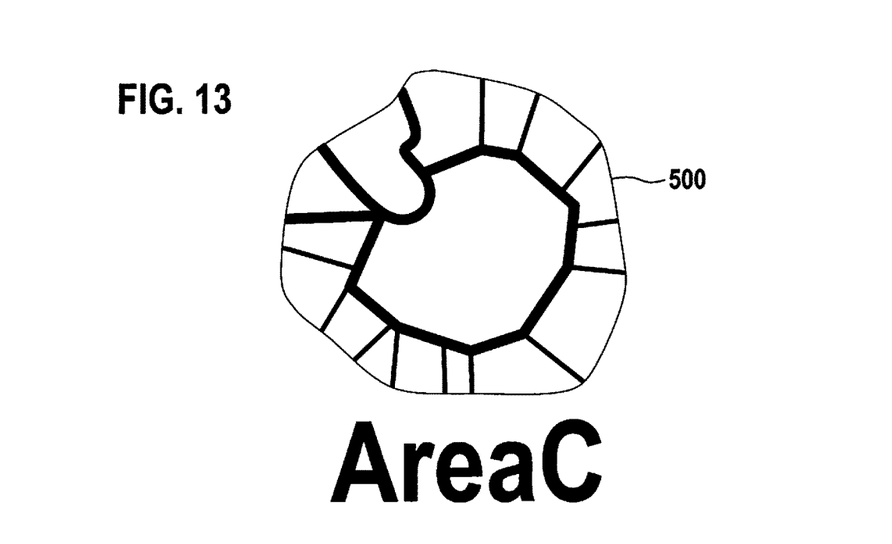
FIG. 13 shows a schematic representation of a traffic sign in Italy that indicates an emission control area according to one exemplary embodiment.

FIG. 13 shows a schematic representation of a traffic sign 500 in Italy, which indicates an emission control area according to one exemplary embodiment. It may be a traffic sign 500 which is recognized by one of apparatuses 100 described on the basis of FIGS. 1 and 2.

If an exemplary embodiment includes an "and/or" link between a first feature and a second feature, it is to be read that the exemplary embodiment according to one embodiment has both the first feature and the second feature, and according to a further embodiment, has either only the first feature or only the second feature.

What is claimed is:
1. A method for altering at least one driving parameter of a vehicle during travel, the method comprising:
   reading in, via an interface to a read-in device, a traffic-sign signal, the traffic-sign signal representing an altered traffic zone, indicated by a traffic sign, at a position;
   reading in, via the interface to the read-in device, a map signal that represents a traffic zone, indicated by a map, at the position;

comparing, via a comparator, the traffic-sign signal to the map signal;

providing, via a processor, an alteration signal for altering at least the driving parameter, if a predetermined relationship exists between the traffic-sign signal and the map signal, the driving parameter including at least one of an engine power output, a transmission control, a chassis control, and an economy (ECO) mode; and altering, based on the alteration signal, the driving parameter, including the at least one of an engine power output, a transmission control, a chassis control, and an economy (ECO) mode.

2. The method as recited in claim 1, wherein, in the providing, the alteration signal is provided if the traffic-sign signal and the map signal agree within a tolerance range.

3. The method as recited in claim 1, wherein, in the reading in the traffic-sign signal, the traffic-sign signal is read in via an interface to a vehicle camera of the vehicle.

4. The method as recited in claim 1, wherein, in the reading in the traffic-sign signal, the traffic-sign signal represents a traffic zone identifying an emission control area.

5. The method as recited in claim 1, wherein, in the providing, the alternation signal is made available, which is provided to change over from a combustion-engine drive to an electric drive.

6. The method as recited in claim 1, wherein, in the providing, the alteration signal is made available, which is formed to transfer the vehicle into an ECO mode.

7. The method as recited in claim 1, further comprising:
storing at least one previous driving parameter that represents a driving parameter prior to the driving parameter being altered.

8. The method as recited in claim 1, further comprising:
further reading-in a leave signal that represents a leaving of the altered traffic zone, indicated by a traffic sign, at a further position, the step of the further reading-in being carried out in response to the step of providing.

9. The method as recited in claim 8, further comprising:
comparing the leave signal to a further map signal that represents a further traffic zone, indicated by the map, at the further position, the step of the further comparing being carried out in response to the step of the further reading-in.

10. The method as recited in claim 8, further comprising:
outputting a reestablishment signal for reestablishing the previous driving parameter is output in response to the further comparing, if the leave signal agrees with the further map signal within a tolerance range.

11. An apparatus for altering at least one driving parameter of a vehicle during travel, comprising:
an interface to a read-in device to read in a traffic-sign signal, the traffic-sign signal representing an altered traffic zone, indicated by a traffic sign, at a position and to read in a map signal that represents a traffic zone, indicated by a map, at the position;
a comparator to compare the traffic-sign signal to the map signal;
a processor to provide an alteration signal for altering at least the driving parameter, if a predetermined relationship exists between the traffic-sign signal and the map signal, the driving parameter including at least one of an engine power output, a transmission control, a chassis control, and an economy (ECO) mode; and
altering, via the processor, based on the alteration signal, the driving parameter, including the at least one of an engine power output, a transmission control, a chassis control, and an economy (ECO) mode.

12. A non-transitory machine-readable storage medium, on which is stored a computer program, comprising:
a program code arrangement having program code for altering at least one driving parameter of a vehicle during travel, by performing the following:
reading in, via an interface to a read-in device, a traffic-sign signal, the traffic-sign signal representing an altered traffic zone, indicated by a traffic sign, at a position;
reading in, via the interface to the read-in device, a map signal that represents a traffic zone, indicated by a map, at the position;
comparing, via a comparator, the traffic-sign signal to the map signal;
providing, via a processor, an alteration signal for altering at least the driving parameter, if a predetermined relationship exists between the traffic-sign signal and the map signal, the driving parameter including at least one of an engine power output, a transmission control, a chassis control, and an economy (ECO) mode; and
altering, based on the alteration signal, the driving parameter, including the at least one of an engine power output, a transmission control, a chassis control, and an economy (ECO) mode.

* * * * *